T. A. SIMMONS.

Assignor, by mesne assignments, to himself, W. A. UNDERWOOD, and D. MCMILLAN; said MCMILLAN assignor to C. M. MCMILLAN.

HAME TUG.

No. 10,287. Reissued Feb. 13, 1883.

Attest.
Geo. T. Smallwood Jr.
Wm. F. Jayes Jr.

Inventor.
Thomas A. Simmons.
By Knight Bros
attys.

N. PETERS, Photo-Lithographer, Washington, D. C.

UNITED STATES PATENT OFFICE.

THOMAS A. SIMMONS, OF WOOSTER, OHIO, ASSIGNOR, BY MESNE ASSIGNMENTS, TO HIMSELF, WELLS A. UNDERWOOD, AND DUNCAN McMILLAN, OF SAME PLACE; SAID McMILLAN ASSIGNOR TO CARRIE M. McMILLAN, OF SAME PLACE.

HAME-TUG.

SPECIFICATION forming part of Reissued Letters Patent No. 10,287, dated February 13, 1883.

Original No. 260,905, dated July 11, 1882. Application for reissue filed December 18, 1882.

*To all whom it may concern:*

Be it known that I, THOMAS A. SIMMONS, a citizen of Canada, formerly residing at Kalamazoo, in the State of Michigan, but now of Wooster, in the State of Ohio, have invented a new and useful Improvement in Hame-Tugs, of which the following is a specification.

My invention relates to that part of a harness which connects the hame with the trace, consisting of a draft-iron with an eye coupling with the hame, a leather covering to said iron, and a buckle and loop to receive and hold the end of the trace connected with it.

The object of my invention is to effect greater convenience and economy in the construction of such devices than heretofore, and also to improve the appearance, durability, &c.

Figure 1:
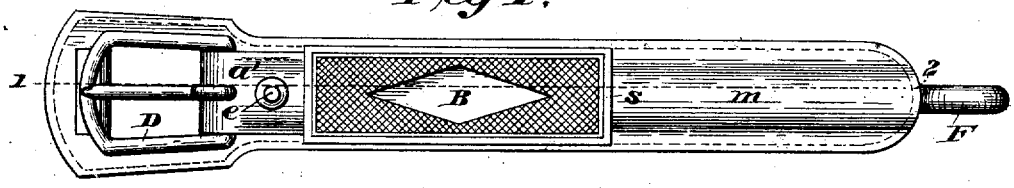
Figure 2:
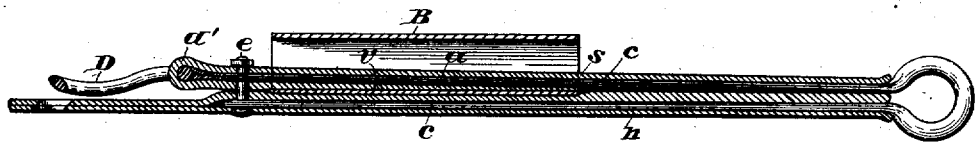
Figure 3:
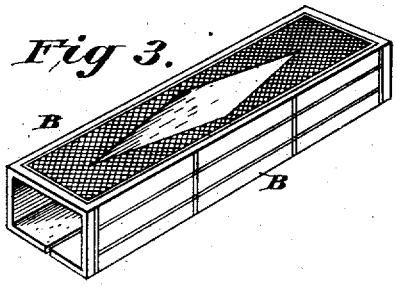
Figure 4:
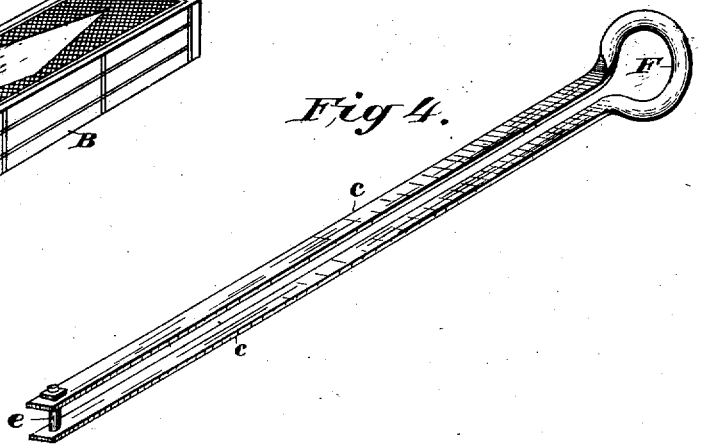
Figure 5:
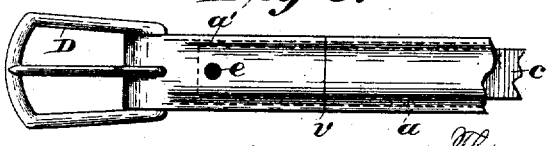

In the drawings forming a part of this specification, Figure 1 is a front side view of the hame-tug complete; Fig. 2, a longitudinal section on the line 2 2 in Fig. 1; Fig. 3, a perspective view of the loop; Fig. 4, a perspective view of the draft-iron; Fig. 5, a front view of a broken portion of the hame-tug with the loop removed.

The draft-iron *c c* is made by bending a strip of metal back upon itself and forming in the bend the eye F, which couples with the hame. (Not here shown.) Heretofore this iron *c* has been made of about the length from F to *c c* in Fig. 2, and has been secured in the leather portion of the tug by a number of rivets inserted through the metal and leather in portion *m*. In my device the arms of the draft-iron are extended to the rear or buckle end of the tug, where the buckle-piece loop and the leather covering or case are all securely held in place by a rivet passing through both arms of the draft-iron. This stiffens the tug, causing it to better retain its proper form, and as the head of the rivet *e* is covered by the end of the trace passed through buckle D and its loop B, the tug presents a better appearance.

The trace is not here shown, but its office will be readily understood in relation to the hame-tug.

The leather portion of the tug consists of straps *m* and *n*, the former having a narrow extension, *a a'*, from *s* to the buckle D. This portion is made hollow, and is severed at *v*, said severed portion *a'* being thus detachably located on the end of the upper arm of the draft-iron. It also bears the trace-buckle D, connected with the end. The latter portion, *n*, consists of a double strap, as in Fig. 2. The leather portions are all sewed, as indicated in the drawings, in a manner to form two recesses to receive the arms of the draft-iron, and to form portion *a a'* detached from portion *n*.

The loop B has heretofore been sewed between the straps of the tug in position shown in Fig. 1. As the loops are manufactured in the form shown in Fig. 3, and purchased by the harness-maker, it is a very difficult undertaking to sew them as above stated. I obviate this by detachably locating said loop over portion *a a'*, as in Figs. 1 and 2, and providing a draft-iron, *c c* F, with arms extended to the rear or buckle end of said loop.

The parts all thus made separate are connected together by inserting draft-iron *c c* in its recesses, entering it at the end near eye F. The loop B is then inserted over portion *a*, connected with *m*, and the several parts bearing the buckle D placed over the end of the upper arm of the draft-iron afterward. The rivet *e* is then inserted through perforations made in the leather and iron, as before stated, fastening all the parts together, as shown in Fig. 2. Such a construction is very desirable in case any parts need replacing with new, as all the parts are readily detached by removing the rivet *e* without necessitating the ripping of any seams or the removal of numerous screws or rivets, as will appear obvious by a reference to the drawings.

Having thus described my invention, what I claim as new is—

1. A draft-iron for hame-tugs having arms *c c*, adapted to extend to the rear or buckle end of the loop and to receive a rivet beyond the loop for connecting the arms and buckle, substantially as set forth.

2. The draft-iron *c c* F, straps *m n*, loop B, buckle D, and rivet *e*, passed through the leather and both arms of the draft-iron in the rear or buckle end of the loop, substantially as and for the purpose set forth.

3. In a hame-tug, the body having suitable recesses for the reception of the extended arms of the draft-iron, the buckle and its connecting-strap provided with a recess to receive the end of the draft-iron arm, and the loop, all secured in proper position by the rivet, substantially as described and shown.

THOMAS A. SIMMONS.

Witnesses:
O. P. FISCHER,
J. D. ROBISON, Jr.